June 23, 1964 A. B. CORNELL 3,138,190
EMERGENCY TIRE CHAINS
Filed March 8, 1963 2 Sheets-Sheet 1
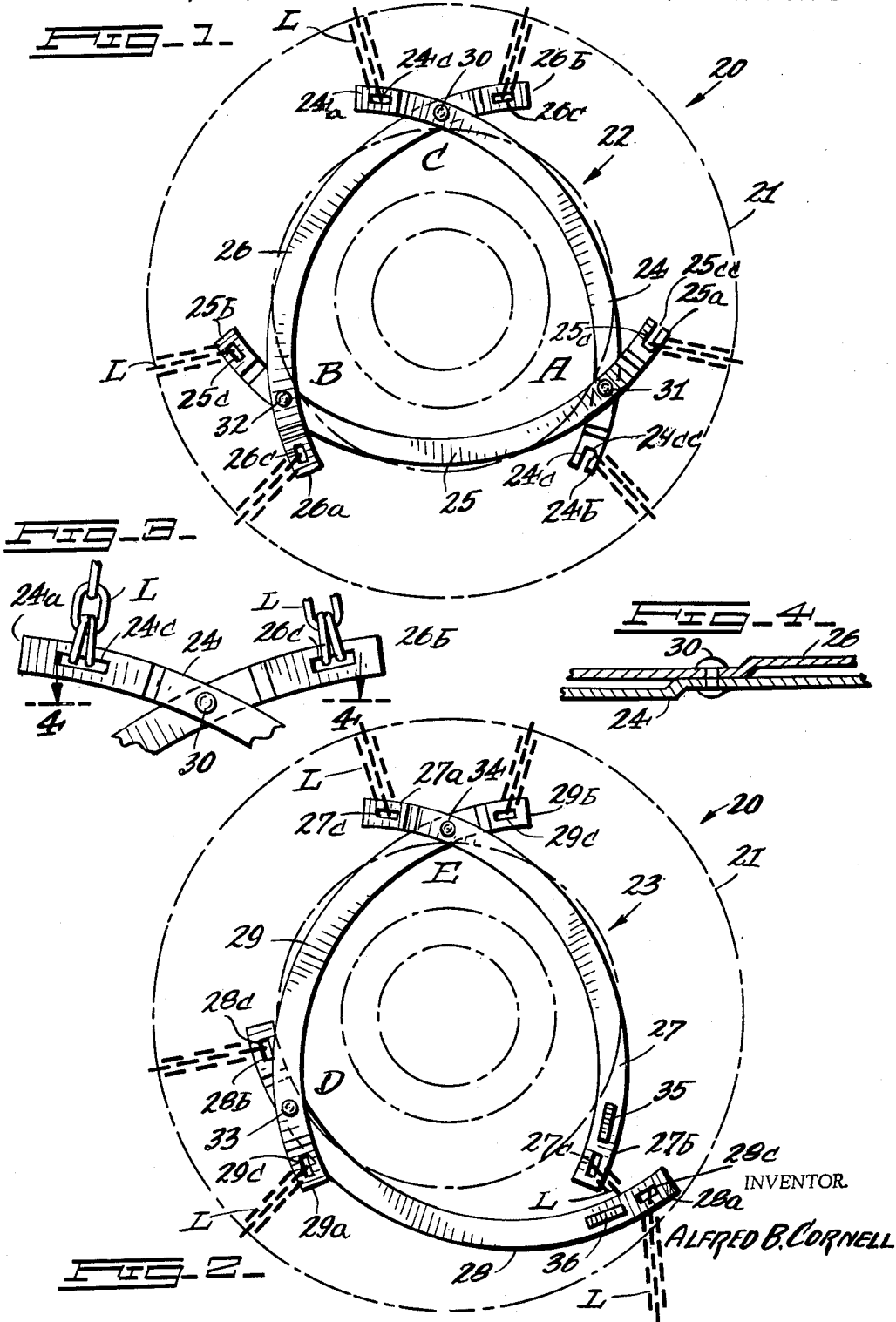
INVENTOR
ALFRED B. CORNELL June 23, 1964 A. B. CORNELL 3,138,190
EMERGENCY TIRE CHAINS
Filed March 8, 1963 2 Sheets-Sheet 2
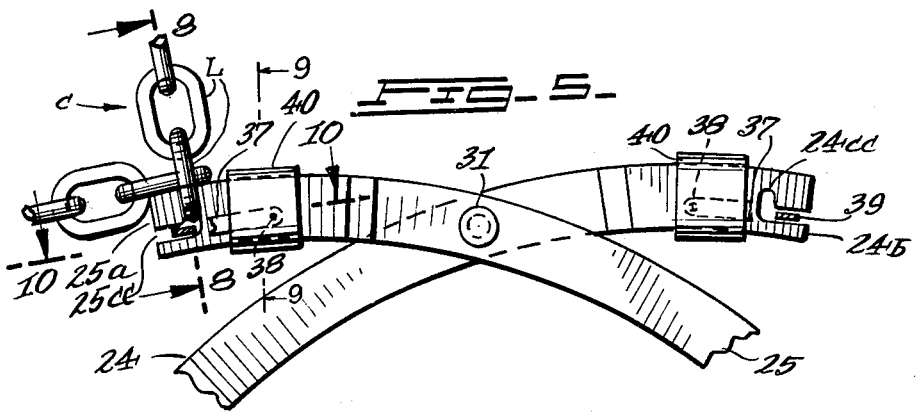
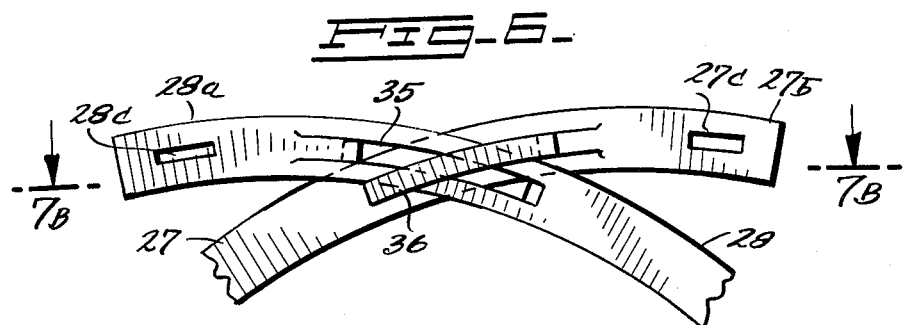
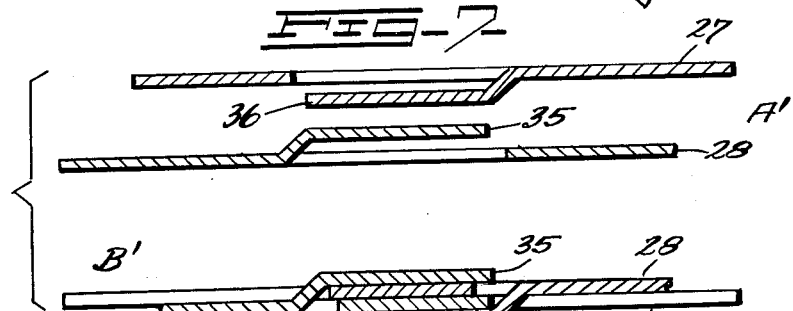
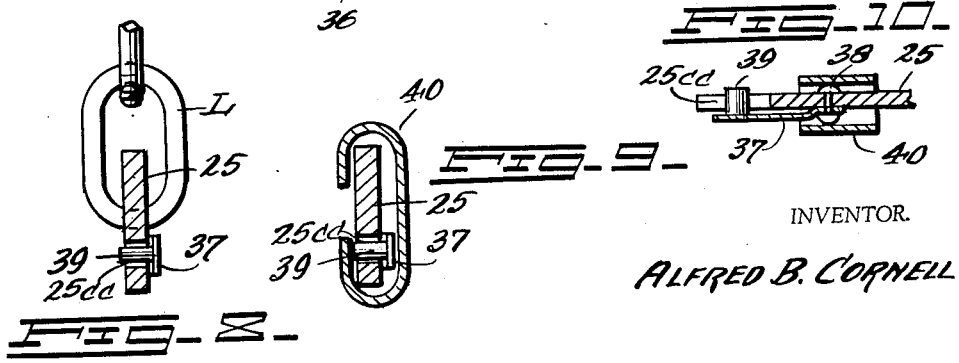
INVENTOR.
ALFRED B. CORNELL

United States Patent Office 3,138,190
Patented June 23, 1964

3,138,190
EMERGENCY TIRE CHAINS
Alfred B. Cornell, 1124 Johnson Ave., Petersburg, Va.
Filed Mar. 8, 1963, Ser. No. 263,975
3 Claims. (Cl. 152—242)

The present invention relates to tire chains, and more particularly to emergency tire chains. The primary object of this invention is to provide a quick and simple method of attaching tire chains to automobile tires with a single operation for each wheel.

Another object of this invention is the provision of tire chains which are inexpensive to manufacture, easy and simple to attach to automobile tires in an emergency, provide adequate traction, and foolproof.

Another object of this invention is the provision of emergency tire chains which eliminate the need for removing wheel covers or the use of wheel slots.

Another object of this invention is the provision of a tire chain device comprising, in combination, a group of arcuate rim bars and link chains in such a manner as to permit the attachment or the removal of the device from the tire in a single operation.

An additional object of this invention is the provision of a device comprising a group of arcuate rim bars and lengths of chain which may be mounted together to the outside and to the inside of a tire, and in such a fashion as to permit the attachment or the removal of the device to or from the tire, in a single operation.

A further object of this invention is the provision of a device composed of a group of arcuate rim bars and link chains, and means for fastening the device to a tire by means of curved extruded hook-like sections in a single operation.

This invention also consists in certain other features of construction, and the combination and arrangement of several parts, to be hereinafter fully described, illustrated in the accompanying drawings and specifically pointed out in the appended claims. In describing the invention in detail, references will be made to the accompanying drawings where like character numerals denote like or corresponding parts throughout the several views, in which:

FIG. 1 is a front elevation showing an embodiment of the invention;

FIG. 2 is a rear elevational view of FIG. 1;

FIG. 3 is an enlarged detailed view;

FIG. 4 is a section taken on the line 4—4 of FIG. 3;

FIG. 5 is an enlarged detailed view of the chain lock;

FIG. 6 is an enlarged detailed view of the bar lock;

FIG. 7 is a section taken on the line 7—7 of FIG. 6;

FIG. 8 is a section taken on the line 8—8 of FIG. 5;

FIG. 9 is a section on the line 9—9 of FIG. 5; and

FIG. 10 is a section taken on the line 10—10 of FIG. 5.

Referring now more particularly to the drawings, the emergency tire chain device 20, made in accordance with the present invention, shown in FIGS. 1 and 2, comprises, in combination, the tire proper 21, one group 22 of three arcuate rim bars and another group 23 of arcuate rim bars. The group 22 is composed of the rim bars 24, 25 and 26, which are mounted on the outside of the tire 21, while the group 23 is composed of the rim bars 27, 28 and 29, which are mounted on the inside of the tire 21 substantially as shown in FIG. 2.

From FIG. 1, it may be seen that the arcuate rim bar 24, at its extreme ends 24a and 24b, is provided with the elongated slots 24c. Likewise, the arcuate rim bar 25 at its extreme ends 25a and 25b is provided with the elongated slots 25c, while the arcuate rim bar 26 at its extreme ends 26a and 26b is provided with the elongated slots 26c. It can be seen that at the extreme ends 25a and 24b the rim bar slots 24c and 25c respectively are shaped to resemble the L-shaped grooves 25cc and 24cc respectively. By means of the rivets 30, 31 and 32, the rim bars 24, 25 and 26 are rigidly held to each other at the sections marked as A, B and C, where the rim bars 24, 25 and 26 cross each other's path, substantially as shown.

Referring more particularly to FIG. 2, which shows the manner in which the inside group of rim bars 27, 28 and 29 are being held to the tire 21, it may be seen that on its extreme ends, 27a and 27b, the arcuate rim bar 27 has an elongated slot 27c; the rim bar 28, at its extreme ends 28a and 28b, has an elongated slot 28c; and the rim bar 29, at its extreme ends 29a and 29b, has the elongated slot 29c. By means of the rivets 33 and 34, the rim bars 27, 28 and 29 are pivotably or hingeably held to each other at the sections marked D and E, substantially as shown. The ends 27b and 28a of the rim bars 27 and 28, are not being connected to each other by means of rivets, but instead they are held by means of the extruded portions 35 and 36 which are shaped in the form of hooks extending beyond the plane of the rim bars 27 and 28, to provide an interlocking grip between the bars 27 and 28, substantially as shown in position marked A' and B' in FIG. 7.

Referring again to FIG. 1, it may be seen that the ends 24b and 25a of the rim bars 24 and 25 have been provided with slots 24cc and 25cc of somewhat different design than the slots 24c and 25c located on the opposite ends of the rim bars 24a and 25b. Likewise, FIG. 5 (which is an enlarged view of the section A), shows the manner in which the rim bars may be provided with locking devices which also provide for tightening and adjustment. To this effect, the ends 24b and 25a have been formed with L-shaped slots 24cc and 25cc, respectively, which may be shaped in such a manner as to allow one link L, of the chain C, to enter the L-shaped slot and to lock itself in its predetermined position, substantially as shown. A small spring steel lock 37, mounted by means of the rivet 38 to the ends 24b and 25a of the arcuate arms 24 and 35, serves the purpose of locking the link L in its respective slot and thus preventing it from dropping out to unlock the chain. The spring steel lock 37 is formed in such fashion as to move sideways when the link L is slipped into its respective L-shaped slot by the operator.

FIG. 8 is a section on the line 8—8 of FIG. 5, showing in greater detail the manner in which the link L is being securely held in the L-shaped slot 25cc. To prevent the spring lock 37 from opening by accident and thus releasing the link L from its hold in the rim bar 25, there may be provided a protective sleeve 40 which may be moved along either one of the ends 24b and 25a of the rim bars 24 and 25. The sleeve 40 is so formed as to embrace its respective rim bar and to be free to slide over the spring lock 37, thus locking it and preventing it from accidentally opening. In addition, by means of the sleeve 40, the lock 37 is protected from dirt and mud (see FIG. 9).

Referring to FIG. 10, which is a section on the line 10—10 of FIG. 6, it shows the manner in which the spring lock extension 36 enters the slot 25cc to lock the link L, while FIG. 7 shows the manner in which (by means of the extruded extensions 35 and 36), the rim bars are interlocked when assembling and installing the chain 22 to the tire 21.

It will now be recognized from FIGS. 1, 2, 5 and 6 that when the operator desires to assemble the emergency tire chain 22 over the tire 21, he simply opens rim bars 27 and 28 to the extent necessary, and places the chain 22 over the tire 21, allowing the rim bars 24, 25 and 26 (rigidly held by rivets 30, 31, and 32), to hang over the outside of the tire 21. In its substantially inoperative position, the chain 22 before assembly has the ends 27b and 28a (in the rim bars 27 and 28), disengaged from each other as shown in FIG. 2, and the link chain L hanging free. With the tire chain 22 mounted over the tire 21, the operator crosses the ends 27b and 28a (in the rim bars 27 and 28) in such a manner as to insert the extruded portion 35 over the section 36, to interlock one to the other (see FIGS. 6 and 7). With this action completed, the operator pulls the free ends of the link chain L, over the rim of the tire 21 (from the inside to the outside), and by pulling upon the chain L, the scissors like action provides the necessary tension to securely hold the attachment, substantially as shown in FIG. 1. To complete the assembly, the operator places one link of the chain L into the L-shaped slot 25cc (see FIG. 5), whereby means of the spring lock 37, the link is securely held to the end 24b of the rim bar 24. The operator now only need tighten the adjacent link chain in the slot 24cc. Finally, the operator slides the protective sleeve 40 over the chain lock 37.

A careful examination of the foregoing description in conjunction with the invention as illustrated in the drawings will enable the reader to obtain a clear understanding and impression of the alleged features of merit and novelty sufficient to clarify the construction of the invention as hereinafter claimed. Minor changes in shape, size, materials and rearrangement of parts may be resorted to in actual practice as long as no departure is made from the invention claimed.

What I claim is:

1. A tire chain of the class described, comprising in combination a pair of substantially triangular frames, one frame in said pair hugging the outside of a tire and the other frame hugging the inside, each of said frames comprising three arcuate rim bars held together, rivet means for connecting said outside bars to each other, rivet and interlocking hook means for connecting said inside bars to each other, to form a substantially triangular body, slots formed in the extreme ends of said bars, link chain secured into said slots, said chains thus connecting the triangular frame on the outside to the triangular frame on the inside of said tire.

2. The combination according to claim 1, and locking means to lock said chains to the tire, said locking means comprising two adjustable and detachable link chains, L-shaped slots in two of said rim bars, said link chain being inserted into said slot, and spring locking means to lock said chain securely in said slot.

3. The combination according to claim 2, and a protective sleeve is provided, said sleeve comprising a moveable bracket, said bracket mounted to slide over said lock, said lock remaining operatively effective until said sleeve is reset by the operator.

References Cited in the file of this patent
UNITED STATES PATENTS

| | | |
|---|---|---|
| 1,277,278 | Whistler | Aug. 27, 1918 |
| 1,511,685 | Spiro | Oct. 14, 1924 |
| 1,769,307 | Price | July 1, 1930 |
| 2,176,631 | Kunkle | Oct. 17, 1939 |
| 2,594,068 | Pike | Apr. 22, 1952 |